United States Patent [19]

Treier

[11] 4,046,404

[45] Sept. 6, 1977

[54] CARBONLESS PAPER FOR USE IN ELECTROSTATOGRAPHIC COPIERS

[75] Inventor: George Treier, Pittsford, N.Y.

[73] Assignee: Xerox Corporation, Stamford, Conn.

[21] Appl. No.: 744,917

[22] Filed: Nov. 26, 1976

[51] Int. Cl.[2] ............................ B41L 1/36; B32B 3/00

[52] U.S. Cl. .................................. 282/27.5; 428/307; 428/327; 428/488; 428/914

[58] Field of Search ............... 428/306, 307, 327, 488, 428/914; 282/27.5

[56] References Cited

U.S. PATENT DOCUMENTS

| | | | |
|---|---|---|---|
| 3,790,435 | 2/1974 | Tanaba et al. | 428/306 |
| 3,868,298 | 2/1975 | Schrade | 428/306 |
| 3,955,025 | 5/1976 | Matsukawa et al. | 428/306 |
| 3,963,851 | 6/1976 | Toyoda | 428/306 |
| 4,003,589 | 1/1977 | Konishi et al. | 428/914 |

*Primary Examiner*—William J. Van Balen
*Attorney, Agent, or Firm*—James J. Ralabate; James P. O'Sullivan; Jerome L. Jeffers

[57] ABSTRACT

Disclosed is a carbonless paper suitable for use in electrostatographic copiers. The paper comprises a base sheet of paper making fibers having uniformly dispersed therein from about 0.05 to 10 weight percent of hollow, generally spherical particles ranging in diameter from about ½ to 200 microns in diameter. These particles serve the purpose of increasing the stiffness and caliper of the paper sheet. The carbonless paper also contains a color forming material encapsulated in discrete particles and/or a color developing material.

17 Claims, No Drawings

CARBONLESS PAPER FOR USE IN ELECTROSTATOGRAPHIC COPIERS

BACKGROUND OF THE INVENTION

Carbonless copy papers are papers which are capable of producing an image upon impact as delivered by an imaging device (typewriter, line printer, accounting machine, etc.) or by the pressure of a pen or pencil in handwritten entry. This is accomplished without the use of interleaved carbon tissue. Chemical carbonless papers function by bringing together, normally through impact or pressure, colorless components which react to produce a legible image. In most carbonless papers, the chemical reaction is similar to that of litmus paper changing color when placed in contact with an acid or alkaline solution. Proper functioning of chemical carbonless paper is dependent on some means of preventing the colorless components from meeting and reacting until this color-producing reaction is desired. The most common method of accomplishing this is through the encapsulation of one of the two components of the image-producing chemical system.

Generally, chemical carbonless papers are prepared in three configurations. The first such configuration is coated back (CB) which involves a sheet of paper with a coating of capsules (containing the color formers in an oil solution), binders and other materials on the back of the sheet. Another configuration, coated front (CF), involves a sheet of paper with a coating of color developing materials, and typically other additives, on the front of the sheet. The third configuration is coated front and back (CFB) which comprises a sheet of paper with a coating of color developers, etc., on its front surface and color forming capsules, etc., on its back surface.

Microscopic capsules, which enclose the color forming dyes, keeping them colorless until an image is formed, are what make chemical carbonless papers work. Carbonless paper manufacturers generally employ discrete capsules for isolating the color forming components from the color developers until pressure or impact breaks the capsules allowing them to react and form an image. The capsules range in size from roughly 3 microns to 15 microns, depending upon the specific system. Typically, the capsules contain an oil solution of color former in its colorless state which has the potential to become colored when released from the capsule. The chemical nature of the color former and the oil solution varies from system to system. The basic steps of encapsulation are essentially the same for all processes. These consist of emulsification of the oil solution in a suitable medium and formation of a polymeric wall around the suspended oil droplets. In some processes, it is necessary to stabilize this polymeric wall by chemical treatment. The wall material of the capsule may vary widely with gelatin, urea-formalhyde resin and nylon type materials being typical. Many other types of synthetic polymers have been used to form capsule walls.

The color formers are generally complex organic molecules which exist in an essentially colorless form, but have the capability of being readily and rapidly changed into an intensely colored form. Most color formers in use today fall into three categories according to the method of color development. The first category consists of compounds which react to mildly acid conditions to form images. The most common of these is crystal violet lacetone which produces a blue image. There are other compounds of this type which produce red, yellow, black and green images. Blends of these materials are often used to provide specific image shades. The second class of color formers functions by oxidation of the molecule for color formation. The oxidation reactions are usually very slow, and cannot be used for initial color development. Instead, they are used to provide color stability in varying degrees. The most commonly used color former of this type is penzoyl leuco methylene blue.

Color developers are substances which cause the colorless color formers to be converted to a colored form when the latter are released from their protective capsules. The color developer, of course, must be selected for a given color forming system to ensure compatability. The most common color forming systems, i.e. those which react to mildly acid conditions, employ either a phenolic resin or an acid clay as the color developer.

The coated back (CB) coatings are comprised of three essential ingredients; capsules containing the color former, cushioning material and binders. The cushioning material of the CB coating is larger in size than the microcapsules and is added to protect these capsules from inadvertent breakage and premature imaging during the processing of the carbonless paper. Cellulose (solka floc) or starch balls (non-gelatinized starch similar to anti-offset starch spray) are typical cushioning materials. Binders suitable for CB coating include such adhesives as starch and polyvinyl alcohol.

Coated front (CF) coatings contain, as the essential ingredient, the color developer. In most cases, the developer is extended by a conventional coating clay (Kaolin) for ease of application. The presence of clay necessitates a binder, usually starch and/or latex.

The separate sheets of carbonless paper are combined into a packet with the paper (from top to bottom) being set up in terms of coated back (CB), coated front and back (CFB) . . . coated front (CF) so that in each case a color former and color developer will be brought into contact when the microcapsules containing the color forming material are ruptured. A variation to the use of CB, CFB and CF paper is the self-contained (SC) carbonless paper in which both the color former and color developer materials are applied to the same side of the sheet or both incorporated into the fiber lattice of the paper sheet.

Carbonless papers are widely used in the forms industry. Typically, pre-printed forms are compiled into a packet so that marking the top form will provide the required number of duplicates. Generally, the carbonless paper is prepared in pre-collated sets in which sheets of various colors and surfaces are packaged in reverse sequence sets wherein the sheets are arranged opposite to their normal functional order. That is, the coated front sheet is first in the set and the coated back sheet last with the required number of CFB sheets in between. This is done so that when the sheets are printed, which automatically reverses their sequence in the delivery tray, they will end up in the proper functional order for subsequent data entry.

Traditionally, carbonless paper forms have been imaged by conventional printing techniques. The advent of high speed electrostatographic copiers with dependable, high capacity collating systems naturally led to attempts to print carbonless paper by this convenient imaging method. Such attempts have been problematical, however, because the base sheets upon which coatings are applied to form carbonless papers are most commonly 13 to 15 lb. basis weight sheets (17 × 22/500), although any weight can be utilized. The problem with using the 13, 15 or lighter weight sheets in electrostatographic copiers lies in the fact that these papers do not have sufficient stiffness (rigidity) or freedom from curl to be handled reliably in the copier's processors or sorters. One solution to this problem would be to prepare carbonless paper on heavier (ca. 20 pound) base sheets. Such sheets would possess the requisite stiffness and caliper but would present economic disadvantages. First of all, the heavier paper itself would be more expensive than that presently in use. In addition, the use of heavier paper will necessarily limit the number of sheets which can be placed in a set and still image. Of lesser importance, but still of some significance, is the fact that the use of heavier papers would necessarily increase the mailing cost of carbonless forms.

It would be desirable and it is an object of the present invention to provide a novel carbonless paper.

A further object is to provide such a paper which is suitable for reliable use in high speed electrostatographic copiers.

SUMMARY OF THE INVENTION

The present invention is a novel carbonless paper suitable for use in electrostatographic copiers. The paper comprises a base sheet of paper making fibers having uniformly distributed therein about 0.05 to 10 weight percent of hollow, generally spherical, lightweight particles ranging in size from ½ to about 200 microns in diameter, said carbonless paper also containing internally or on the surface a color forming material encapsulated in discrete capsules and/or a color developing material.

DETAILED DESCRIPTION AND PREFERRED EMBODIMENTS

Base sheets for the carbonless papers of the present invention are prepared by incorporating a plurality of hollow, generally spherical particles which define a concentric, generally spherical cavity therein. Generally, these particles range in diameter from about ½ to 200 microns, however, the particles preferably have diameters ranging from about 3 to 50 microns and most advantageously from about 5 to 20 microns. Generally, the particles are selected from those materials having bulk densities ranging from about 0.2 to 3 pounds per cubic foot. Such particles are commercially available and can be made from glass, phenolic plastics and urea formaldehyde resins. A preferred material is one of the vinyl chloride/vinylidene chloride copolymers marketed by the Dow Chemical Company under the trademark Saran. Preferably such particles are prepared from thermoplastic resinous materials rather than thermosetting materials. This is the case because the thermoplastic resinous materials are less brittle and can be prepared from polymers having widely differing physical properties. Such small, resinous, hollow particles can be prepared by the limited coalescence polymerization technique utilizing a polymerizable monomer and a volatile blowing agent which exhibits a limited solublity in the polymer. This method of preparation is more fully described in U.S. Pat. No. 3,293,114.

By using the limited coalescence process, a wide variety of expanded plastic particles can be attained. These expanded particles are spherical in shape and have a concentric spherical cavity. The hollow spherical particles are readily incorporated into a paper pulp by admixture with the wet pulp prior to deposition on the Fourdrinier or twin wire machine screen or on the collecting surface of a cylinder machine. Depending on the particular surface characteristics of the spherical particle, it may be necessary to incorporate a coagulant or retention aid into the pulp slurry to assure that a major portion of the thermoplastic particles are deposited on the surface of the pulp fibers and are not carried away by the white water.

Generally the spherical particles are utilized in concentrations of from about 0.05 to 10 percent by weight. If papers of minimum bulk density are required, a maximum quanitity of spherical particles are incorporated therein. If maximum physical strength is required, lower quanitities are used. The use of about 0.5 to 5 weight percent of particles has been found to be especially desirable for preparing papers useful in electrostatographic copiers. The incorporation of the plastic particles provides on an equal basis weight comparison a significant increase in the stiffness of the paper as well as a significant increase in the caliper. By appropriate selection of the size and quantity of spherical particles incorporated into the paper making fiber matrix, a paper sheet having the desired bulk, stiffness and weight can be prepared. Pre-blown microspheres can be added directly to the paper making pulp. Alternatively, those particles which contain a blowing agent which is activated at a temperature of from about 150° to 250° F can be expanded on the drying wires of the paper making machine.

While any of the known lightweight papers can be used as the base sheet in the present invention, certain specially treated lightweight papers are preferred for use in electrostatographic copiers. These papers, more fully described in U.S. Pat. No. 3,884,685, bear a surface size comprising a soluble metal sulfate in a binder with the salt accounting for from 1 to 50 weight percent of the binder. The salt has been found to be useful in terms of enhancing the electrical and anti-scorch properties of the paper.

In preparing a sheet of coated back carbonless paper, microcapsules containing the color forming material and the cushioning material are dispersed in a binder. The particular binder material is not critical to the electrostatographic copy paper of the instant invention. Accordingly, any commercially available binder material conventionally used in paper coating processes can be used. Typical binders include starch, starch derivatives, polyvinyl alcohol, polystyrene and mixtures thereof. When a soluble sulfate is used, it can be added to this composition before its application to the paper. In addition, clay will normally be added as a coating material. The coating is usually applied from its aqueous dispersion and the water evaporated to leave a continuous coating on the paper. Air knife coating techniques are used to coat the lightweight paper substrate in the coated back configuration. The coated back sheet cannot be calendered nor can roll coating techniques be used due to the pressure sensitivity of the color forming capsules.

The coated front sheet is prepared in a similar manner except that a color developer rather than an encapsulated color former is added to the binder material. Some calendering can be tolerated by the coated front sheet, although the pressure must be rather light, lest the microspheres in the base sheet be crushed. The coating of the coated front sheet may be accomplished by either air knife, blade or roll coating techniques.

The coated front and back sheets are prepared by coating the back side of the sheet with an encapsulated color forming material and the front with a color developing material. This sheet can be lightly calendered after the front is coated and before the back side thereof is coated.

The so-called self-contained carbonless papers are prepared in a similar manner except that the color forming and color developing materials are applied to the same side of the sheet. These materials can also be contained internally in the sheet itself as opposed to being on the surface.

After coating the sheets with the proper material, they are combined into packets containing the requisite number of CB, CFB . . . , CF sheets. As previously mentioned, these packets can be reverse collated to provide CF, CFB . . . , CB packets which will be placed in the right order after being imaged. Of course, reverse collation is not necessary when the sheets are imaged on those electrostatographic copiers which have automatic collating systems which place the first sheet imaged on the top of the stack.

After imaging the carbonless paper of the present invention, the sheets are attached to each other to form a unitary packet which is ready for use.

The method of practicing the invention is further illustrated by the following examples:

EXAMPLE I

The paper substrate for use in the present invention is prepared by adding to a pulp slurry about 3 percent by weight, based on the dry pulp, of Saran microspheres. The pulping composition is fed into a paper making machine which sequentially forms a paper sheet of the pulp fibers and microspheres and applies a surface size composition comprising 12 percent sodium sulfate, 38 percent clay and 50 percent ethylated starch in an aqueous dispersed solution. This method provides a lightweight paper having the requisite stiffness and caliper so as to function properly in electrostatographic copiers without any signs of discoloration.

EXAMPLE II

A lightweight paper is prepared by the previously described method except that the top side of each sheet is coated (either on or off the paper making machine) with a phenolic resin coating. The phenolic resin is low molecular weight, i.e. dimer, trimer or tetramer with approximately 10% monomer. The phenolic resin serves as the color developer and the sheets prepared in this manner form the coated front constituent of chemical transfer carbonless sets.

EXAMPLE III

A coated front sheet is prepared as in Example II except that a formulation comprising about 10% phenolic resin with kaolin clay using starch latex as binder is used as the coating. In this type of embodiment, 5 to 50% of the phenolic resin can be used.

EXAMPLE IV

A paper sheet is prepared as in Example II except that the front coating is an acid clay, i.e. silton clay, as the predominant coating constituent and color development material. EXAMPLE V A coated back sheet is prepared by coating the back of the sheet with a plurality of approximately 5 micron diameter urea-formaldehyde microcapsules containing crystal violet lactone (CVL) as the color former. The microcapsules are coated from aqueous dispersion which also contains starch granules as the cushioning agent and a starch binder. This coating is applied to the paper surface by air knife techniques to avoid rupturing of the color former containing capsules.

EXAMPLE VI

A coated back sheet is prepared as in Example II except that the color forming material is benzoyl leuco methylene blue.

EXAMPLE VII

A coated front and back carbonless sheet is prepared by applying the phenolic resin of Example II to the back of the lightweight paper prepared as in the first example. Microcapsules containing crystal violet lactone are applied to the back of the sheet as described in Example V. Sheets prepared in this manner are imaged on a Xerox 7000 copier/duplicator and are found to be readily handled by the paper handling elements of the machine. Coated front and coated back sheets are similarly imaged.

The imaged carbonless paper sheets are collated into stacks of CB, $(CFB)_3$, CF with the front of each sheet bearing the image which comprises a standard business form. Marking the top, i.e. coated back, sheet with pencil results in an identical marking on the front of each sheet in the stack.

EXAMPLE VIII

A coated front and back sheet is prepared as in Example VII except that the color developer on the back of the sheet is silton clay and the encapsulated color former on the front of the sheet is leuco methylene blue.

Sheets prepared in this manner are imaged on a Xerox 9200 duplicator and collated to form a packet with the top (CB) sheet having a layer of silton clay on its back side and the bottom (CF) sheet bearing benzoyl leuco methylene blue containing microcapsules on its front side. The business forms on the front of each are filled out as in the previous example.

What is claimed is:

1. A carbonless paper sheet suitable for imaging in electrostatographic copiers which comprises a base sheet of paper making fibers having uniformly distributed therein from about 0.05 to 10 weight percent of hollow, generally spherical particles ranging in diameter from ½ to about 200 microns, said carbonless paper also containing a color forming material encapsulated in discrete capsules and/or a color developing material.

2. The paper sheet of claim 1 wherein the hollow, generally spherical particles are from about 3 to 50 microns in diameter.

3. The sheet of claim 2 wherein the particles are from about 5 to 20 microns in diameter.

4. The paper sheet of claim 1 wherein the hollow, generally spherical particles are comprised of a vinyl chloride/vinylidene chloride copolymer.

5. The paper sheet of claim 1 wherein the concentration of particles is from about 0.5 to 5 weight percent.

6. The paper sheet of claim 1 wherein a color forming material encapsulated in discrete capsules is coated on one side thereof along with a binder to hold the capsules in place.

7. The paper sheet of claim 6 wherein the binder is starch, a starch derivative, polyvinyl alcohol, polystyrene or a mixture thereof.

8. The paper sheet of claim 6 wherein a cushioning material is combined with the binder and color former containing capsules.

9. The paper sheet of claim 6 wherein the walls of the capsules are comprised of gelatin, a urea-formaldehyde resin or nylon.

10. The paper sheet of claim 6 wherein the color forming material is crystal violet lactone or benzoyl leuco methylene blue.

11. The paper sheet of claim 1 wherein one side is coated with a color developing material.

12. The paper sheet of claim 11 wherein the color developing material is extended with a coating clay and combined with a binder.

13. The paper sheet of claim 12 wherein the coating clay is Kaolin and the binder is starch.

14. The paper sheet of claim 13 wherein the color developing material is a phenolic resin or an acid clay.

15. The paper sheet of claim 1 wherein one side is coated with a color developing material and the other side is coated with a binder having dispersed therein a cushioning material and a color forming material encapsulated in discrete capsules.

16. The paper sheet of claim 1 wherein the color developing material and encapsulated color developing material are coated on the same side of the sheet to form a self-contained carbonless paper.

17. The paper sheet of claim 1 wherein the color developing material and encapsulated color forming material are dispersed among the paper making fibers to form a self-contained carbonless paper.

* * * * *